Dec. 23, 1941. E. T. HOLTZ 2,266,758
TENSION LOCK BOLT
Filed Aug. 30, 1937
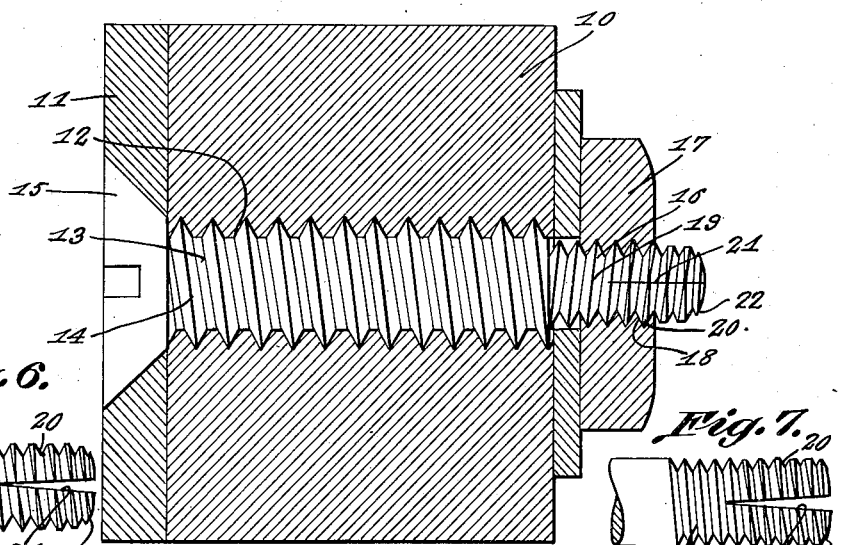
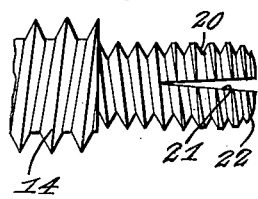
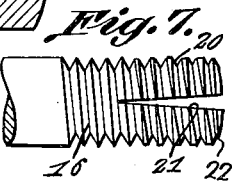
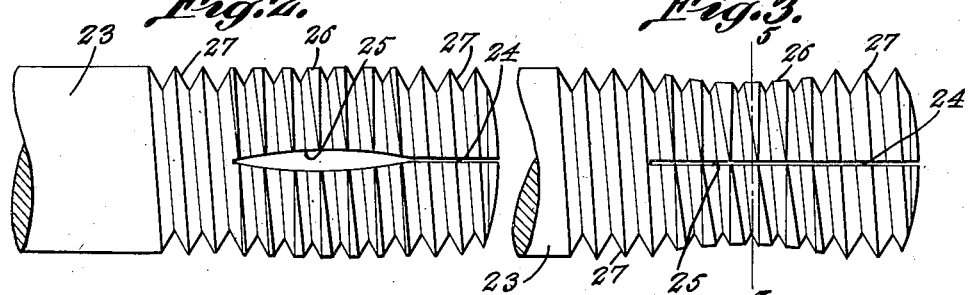
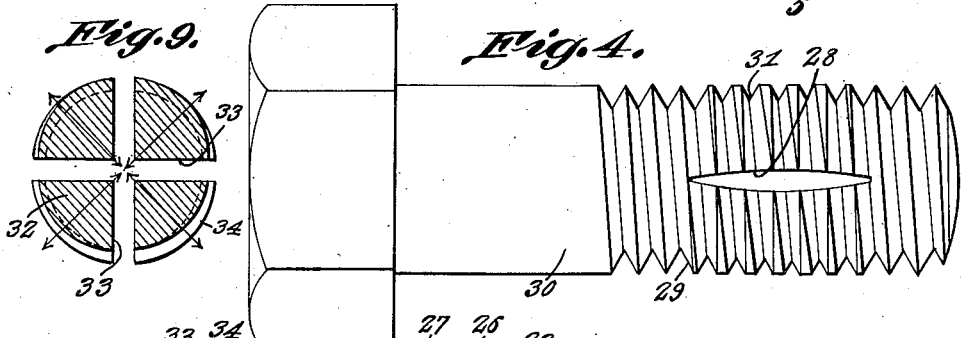
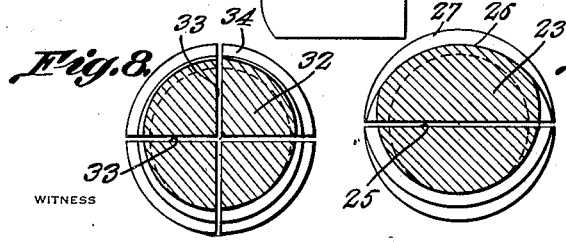

Patented Dec. 23, 1941

2,266,758

UNITED STATES PATENT OFFICE 2,266,758

TENSION LOCK BOLT

Emil T. Holtz, Los Angeles, Calif.

Application August 30, 1937, Serial No. 161,657

4 Claims. (Cl. 151—32)

This invention relates to tension lock bolts and structures and has for an object to provide a lock bolt provided with a longitudinal cleft in a part of the threaded portion and having a permanently expanded resilient portion provided with screw threads of normal uniform pitch throughout its entire threaded length and having a portion of the apices of the threads of the expanded portion removed, the apices of all the threads reduced and otherwise being at the same radial distance from the center line of the bolt, this novel construction permitting the bolt entering tight fitting work freely without damage to the threads while the resilient section remains in expanded (normal) position, and wherein the resilient section operates automatically and is always in action as soon as the nut is applied, permitting the nut to be removed and re-applied as desired without alteration or damage to the threaded structures. Further advantages being, that no adjustments are necessary during the cycle of first using the bolts and nuts, then removing them and re-using them; no special nut being necessary, and any ordinary nut of the same size and type of the thread of the bolt may be used.

A primary object is, to provide that when the nut shall have been screwed to place upon the bolt, the "tension lock" produced by the resilient section will prevent the nut from becoming loose and turning or backing itself off the bolt due to vibration. However, the major object is to provide a structure that will eliminate the cause, so that the nut will not tend to become loose or turn of itself; and further, to provide a threaded structure that will contain within itself the above named essential features of the tension lock device while at the same time conforming to uniform outside diameter and uniform pitch threads throughout its full threaded length the same as an ordinary common bolt or threaded structure; and further to provide a threaded structure that will readily mesh with the threads of an ordinary and like uniform pitch and cylindrically threaded nut or connecting members. Thus in use, only the same performance and manipulation are required as would be necessary were an "ordinary" threaded bolt or structure, fitting its work with precision.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a tension lock bolt structure constructed in accordance with the invention in applied position and used as an extension in combination with an ordinary screw bolt.

Figure 2 is an enlarged side elevation of the threaded end of a modified form of the tension lock bolt showing the cleft and showing all of the threads to be of uniform pitch and showing the resilient section located intermediate of the ends of the threaded portion and showing a portion of the apices of the threads of the tension section cut away, the apices of all the threads reduced or otherwise being at the same radial distance from the center line of the bolt.

Figure 3 is a view similar to Figure 2 but showing how the resilient section appears when it has been engaged and compressed by the threads of the nut, thereby producing the tension which firmly unites the threads of the bolt with those of the nut to prevent the nut from becoming loose or turning due to vibration.

Figure 4 is a view similar to Figure 2 except that it shows the cleft as terminating short of the extreme end of the bolt.

Figure 5 is a cross sectional view taken on the line 5—5 of Figure 3 showing the resilient portion when in normal expanded position and in dotted lines when compressed by the nut.

Figure 6 is a detail side elevation of a bolt structure constructed in accordance with the invention and used as an extension in combination with an ordinary screw bolt the same as shown in Figure 1 except that the threads shown in Figure 6 are of opposite turn to those shown in Figure 1.

Figure 7 is a detail side elevation of the bolt structure representing either the end of a bolt or the end of any other threaded structure constructed in accordance with the invention.

Figure 8 is a cross sectional view similar to Figure 5 but showing a modified form of the invention in which the resilient section is formed of segments by providing clefts intersecting each other at a right angle and showing in full lines the resilient section in normal expanded position and in dotted lines when compressed by the nut.

Figure 9 is a cross sectional view similar to Figure 8 but showing the segments of the resilient section in full lines in open normal expanded or relaxed position (as when the nut has been removed) and showing in dotted lines the movement of the resilient segments under pressure of the nut and during backing off of the nut.

Hitherto lock bolts having full height normal uniform threads the full length of their threaded sections, split or cleft longitudinally, centrally of the axis, for a portion of the length of the threaded section, have been known. But in all such devices the split portion of the bolt must be in closed position when the bolt is entered into the hole or opening in the work that is to receive the bolt. If previously spread, the bolt must be manually manipulated to compress the split portion to enter the work, otherwise if an attempt is made to drive the bolt in the threads are so damaged that the nut cannot be effectively applied. Wedges have hitherto been used in connection with the old devices to mesh the threads of the bolt with the threads of the nut when the split is expanded.

With the above in mind, the present invention provides a bolt from which a portion of the apices of the threads of the tension section have been removed so that the apices of all the threads removed and otherwise are the same radial distance from the center line of the bolt while the kerf remains open; thus the bolt is enabled to be easily entered into a precision-fit opening in the work which is to receive it without damage to the threads; the kerf then being closed by compression of the resilient section of the bolt when the threads of the nut are screwed onto the threads of the resilient section to exert tension upon the nut and positively prevent the nut from becoming loose or backing itself off from the bolt due to vibration or any other cause.

Referring now to the drawing in which like characters of reference designate similar parts in the various views, 10 and 11 designate parts of any article or piece of work which is to be connected by a bolt. The part 10 is provided with an opening 12. In case the part 10 is of dense material such as iron or steel the opening 12 should be provided with threads to match the threads of the screw bolt 13. But if the part 10 is of wood or other similar material the opening need not be threaded, since the threads of the screw bolt are such that they will cut their own channel for the threads as it is screwed through the work.

In carrying out one embodiment of the invention I provide a screw bolt 13 having screw threads 15 of uniform pitch and depth to be threadedly engaged with the work 10, the bolt having a head 15 of any desired shape to engage against the part 11 to be joined to the part 10.

The screw bolt 13 is provided with an extension 16, comprising a complete tension lock structure, to receive a nut 17 which has screw threads 18 of cylindrical alignment, full depth and uniform pitch.

The extension 16 is provided with screw threads of uniform pitch its full length. To provide the tension lock structure, a kerf 21 is formed in the end of the extension by splitting the extension longitudinally, centrally of its axis for a portion of its length dividing that part of the extension into segments which are permanently spread or sprung apart in a direction opposite to that of the kerf as shown by 21 in Figure 6 to provide that part known as the resilient section while the balance of the extension is called the unsplit section. The unsplit section has threads 19 of full height while a portion of the apices of the threads of the resilient section have been removed, so that the apices of all the threads reduced and otherwise are at the same radial distance from the center line of the bolt as shown by 20 in Figures 6 and 7, while the kerf 21 remains open, the normal position of the resilient section. In Figure 1, 20 also shows the threads of the resilient section with a portion of their apices removed, but the nut 17 is shown in applied position, thereby compressing the resilient section to closed or active position thus providing the tension lock, also, thereby closing the kerf 21 to form a practically solid and strong structure, and also showing that by this action the vertices (grooves) of the threads of the resilient section become automatically aligned cylindrically with those of the unsplit section and also of course aligned cylindrically with the apices of the threads of the nut. That is, when the kerf is closed, the bases of all the threads, reduced or otherwise, are at the same radial distance from the center line of the structure, as shown in Figure 3.

In practice the nut 17 is applied to the extension in the usual manner by means of a wrench, and during application, as previously described, this action serves as a lever to compress the segments of the resilient section and close the kerf or split 21. The natural tendency of this split to open exerts a tension upon the segments of the resilient section to frictionally engage the threads of the nut and positively prevent loosening or backing off of the nut under most severe conditions of service. However, the nut may be removed by means of a wrench and the bolt and nut used over again, since by virtue of the split being open in normal position and all of the threads being of normal uniform pitch and having all of their apices the same radial distance from the center line of the bolt no threads of the bolt or structure or of the nut will be destroyed regardless of how many times the bolt and the nut are removed and replaced.

The bolts may be made and the threads formed in the regular manner the same as in ordinary bolt manufacture, then forming the cleft and then removing the proper portion of the apices of the threads of the resilient section or they may be made in any manner as desired.

As previously mentioned and as shown by 22 in Figures 1, 6 and 7, the threads at the outer end of this type of bolt should be slightly tapered spirally to compensate for the amount of spread of the resilient section, permitting easy application of the nut to the bolt, and further, to provide the necessary lever action to actuate the resilient section.

In Figure 2 there is shown a modified form of the invention in which the bolt 23 is provided at the end with a series of threads of normal uniform pitch and is further provided at the end with an axially located cleft 24, the inner end of the cleft having been expanded to form the resilient section 25 as indicated intermediate of the unspread sections 27. This expanded portion of the cleft may be substantially elliptical in shape. A varied portion of the apices of the threads of the tension resilient have been cut away so that the apices of all the threads reduced and otherwise are the same radial distance from the center line of the bolt, as indicated by the numeral 26.

Thus in the modified form of the invention shown in Figure 2, when the nut is applied the cleft 24 will be closed at the expanded portion or tension section 25 thereof, as best shown in Figure 3, due to the threads of the nut compressing the tension section as the nut is screwed tightly upon the work. As previously described, the threads of the tension section exert pressure upon the threads of the nut due to the tension section tending constantly to expand and return to normal expanded position, and thereby the nut is frictionally held against displacement, and all waves of vibration transmitted from the work to the bolt and the nut will be in harmony, that is, in the same frequency, and thereby the threads of both the bolt and the nut will be preserved from crystallization and disintegration due to the out-of-time vibration which is present in ordinary threaded structures.

In Figure 4 there is shown a modified form of the invention in which the cleft 28 does not extend through the end of the bolt but is formed axially in the bolt intermediate of the ends of the threaded portion 29 of the bolt 30 to form the tension section in expanded position. The threads 31 are formed and arranged as just described in connection with the description of Figures 2 and 3 and the operation and action is also the same as therein described.

In Figures 8 and 9 a modified form of the invention is shown in which the bolt 32 is provided at the threaded end with axially located clefts 33 which intersect each other at a right angle, and these clefts divide that portion of the bolt into spring segments which comprise the tension section. These clefts if viewed individually from a side elevation would appear substantially the same as the clefts shown by 21 in Figures 1, 6 and 7, and their operation and action also is similar, except that the segments in Figures 8 and 9 expand and are compressed in a direction diagonal to that of the clefts as shown diagrammatically by the double-headed arrows in Figure 9. The threads 34 are formed in the regular manner and are all of uniform pitch. A portion of the apices of the threads of the tension section are removed and the threads at the outer end of this type of bolt are slightly tapered spirally for the same purposes and reasons as described previously in the descriptions for Figures 1, 6 and 7, and the operation and use of the bolt and nut and tension effect is the same, namely, to hold the nut against displacement under all conditions of service; yet of such design that the nut may be readily removed with a wrench, and the bolt and nut may be removed and replaced as often as desired without alteration and without any loss of efficiency, in an opening in the work in which it is to fit with precision.

While various views and modifications have been shown and described in the drawing attached herewith, the essential features, actions, effects and uses are substantially the same; the desire being, to show some of the modified methods of their application.

While a bolt and a nut have been specifically mentioned throughout most of the specification it is to be understood that the scope of the invention extends to any structure not requiring the use of a nut, as for example, when a cylindrical bolt or other member, threaded as above described, is advanced into a piece of work, the work itself functions as a nut and no nut is necessary.

From the above description it is thought that the construction and operation of the invention will be fully understood without further explanation.

What is claimed is:

1. A cylindrical male structure having an axial cleft in a portion thereof, the structure being externally provided with threads of uniform pitch throughout the cleft and uncleft portions thereof, the cleft portion forming a resilient section of the structure while the cleft remains open, the threads of said resilient section having a portion of the apices removed, the apices of all the threads reduced and otherwise being at the same radial distance from the center line of the structure to permit application to the structure of a female member having threads of uniform pitch without damage to the threads of the structure or to the threads of the female member, the cleft being substantially closed by compression of the resilient section when the female member is applied thereto, the bases of all the threads, reduced or otherwise, then being at the same radial distance from the center line of the structure, and the resilient section then exerting tension upon the female member to prevent the female member becoming dislodged without damage to the threads of the structure or to the threads of the female member.

2. A cylindrical male structure externally provided with threads of uniform pitch, there being an axial cleft in an end portion of the structure forming segments sprung outward from each other to provide a resilient section of the structure while the cleft remains open, the threads of said resilient section having a portion of the apices removed, the apices of all the threads reduced and otherwise being at the same radial distance from the center line of the structure to permit application to the structure of a female member having threads of uniform pitch without damage to the threads of the structure or to the threads of the female member, the cleft being substantially closed by compression of the resilient section when the female member is applied thereto, the bases of all the threads, reduced or otherwise, then being at the same radial distance from the center line of the structure, and the resilient section then exerting tension upon the female member to prevent the female member becoming dislodged without damage to the threads of the structure or to the threads of the female member.

3. A cylindrical male structure externally provided with threads of uniform pitch, there being clefts in one end of the structure intersecting each other at substantially a right angle to provide spring segments which form a resilient section of the structure while the clefts remain open, the threads of said resilient section having a portion of the apices removed, the apices of all the threads reduced and otherwise being at the same radial distance from the center line of the structure to permit application to the structure of a female member having threads of uniform pitch without damage to the threads of the structure or to the threads of the female member, the clefts being substantially closed by compression of the resilient section when the female member is applied thereto, the bases of all the threads, reduced or otherwise, then being at the same radial distance from the center line of the structure, and the resilient section then exerting tension upon the female member to prevent the female member becoming dislodged without damage to the threads of the structure or to the threads of the female member.

4. A cylindrical male structure externally provided with threads of uniform pitch, there being an axial cleft formed in a portion of the structure forming segments sprung outwardly from each other to provide a resilient section of the structure while the cleft remains open, the threads at the extreme end of the resilient section being slightly tapered spirally to compensate for the amount of spread of the resilient section to permit easy application of a female member to the male structure, and to provide the necessary lever action to actuate the resilient section, the threads of the resilient section having a portion of the apices removed, the apices of all the threads reduced and otherwise with the exception of the spirally tapered threads being at the same radial distance from the center line of the structure to permit application of the female member without damage to the threads of the structure or to the threads of the female member, the cleft being substantially closed by compression of the resilient section when the female member is applied thereto, the bases of all the threads, reduced or otherwise, then being at the same radial distance from the center line of the structure, and the resilient section then exerting tension upon the female member to prevent the female member becoming dislodged without damage to the threads of the structure or to the threads of the female member.

EMIL T. HOLTZ.